United States Patent [19]

Rowe

[11] Patent Number: 4,507,863
[45] Date of Patent: Apr. 2, 1985

[54] PACKSAW

[76] Inventor: Jerry D. Rowe, P.O. Box 733, Dubois, Wyo. 82513

[21] Appl. No.: 407,639

[22] Filed: Aug. 12, 1982

[51] Int. Cl.$^3$ .............................................. B27B 21/00
[52] U.S. Cl. ..................................... 30/166 R; 30/144
[58] Field of Search ................. 30/166, 153, 144, 143; 145/31 A, 31 AB, 108 R, 108 A, 108 B, 109, 110; 7/148

[56] References Cited

U.S. PATENT DOCUMENTS

| | | | |
|---|---|---|---|
| 229,706 | 7/1880 | Jansen | 30/153 |
| 350,403 | 10/1886 | Van Ostrand | 145/31 AB |
| 881,294 | 3/1908 | Billings | 30/153 |
| 1,282,404 | 10/1918 | Fife | 30/144 |
| 2,820,291 | 1/1958 | Philippar | 30/143 X |
| 3,521,353 | 7/1970 | Fabyan | 30/144 |

Primary Examiner—Jimmy C. Peters
Attorney, Agent, or Firm—Andrus, Sceales, Starke & Sawall

[57] ABSTRACT

A compact packsaw is conveniently housed in a casing. The saw includes a flat tapered blade having different teeth on opposite edges with a multiple part collapsible handle, including opposed U-shaped channels, each havng a short mounting leg and a longer handle leg. The channel legs are recessed or slotted. The short legs are pivoted to the wide end of the blade with the bases abutting to define a T-shaped handle. The abutting channel members pivot away from each other, around the end of the blade and to the opposite edges. The recessed handle legs telescope over the blade.

5 Claims, 4 Drawing Figures

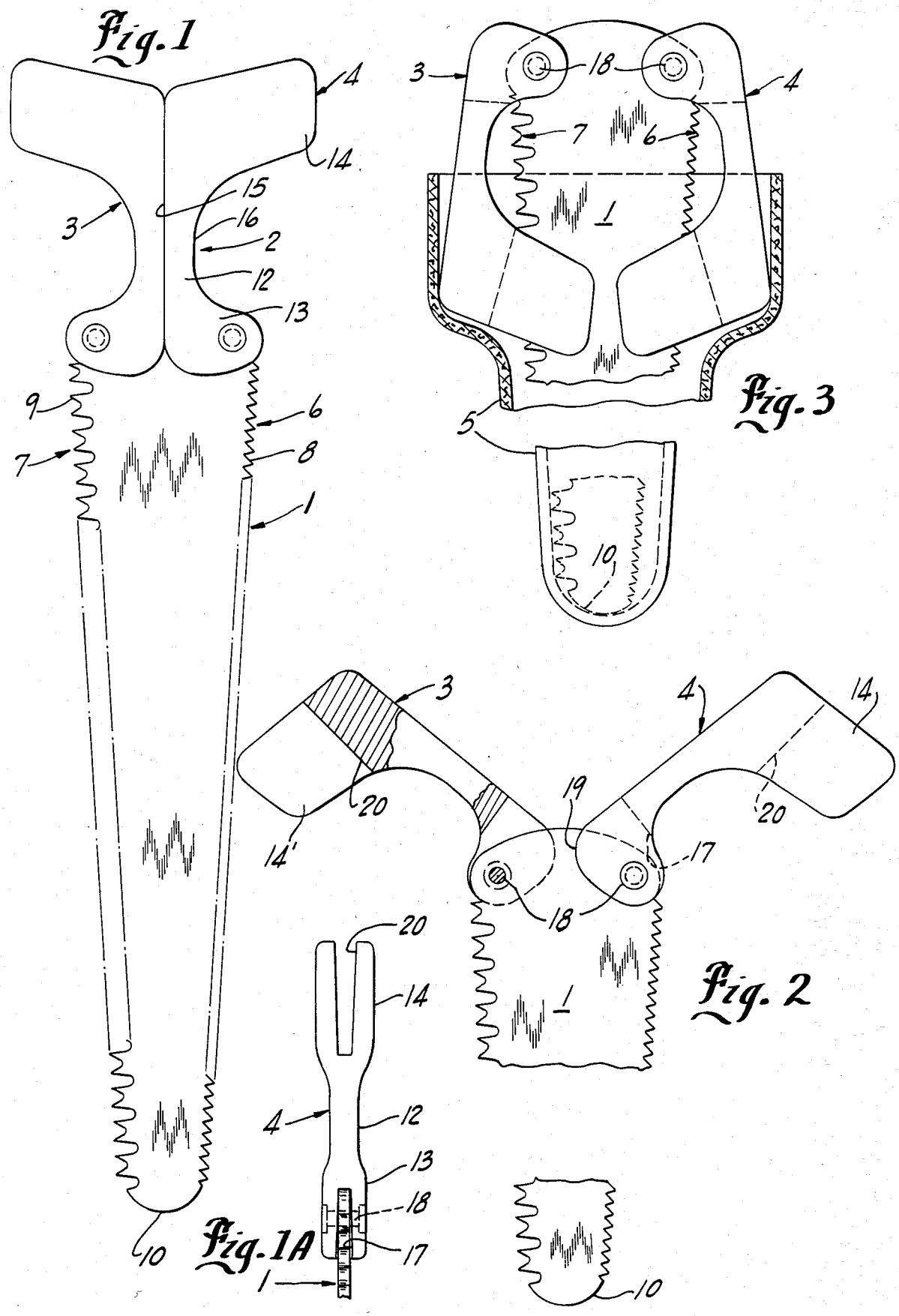

PACKSAW

BACKGROUND OF THE INVENTION

This invention relates to a packsaw and particularly to a compact, portable packsaw adapted to be conveniently carried by a person, as well as packed as a part of a wilderness supply pack.

Both professionals and amateur back-packers, woodsmen, campers and the like require a plurality of instruments for use in the woods. A packsaw is widely used in the wilderness, particularly within the mountain areas, for cutting of wood, animals and the like. Packsaws are generally provided with relatively elongated blade structures with a fixed handle structure to the one end. A case is generally provided for housing of the saw during transport. The case of course protects the personnel against possible injury from the blade, and also protects the blade from damage.

Although many versions of packsaw are available, they are generally large devices which are not conveniently transported other than as part of a relatively large supply pack or assembly.

There is a distinct need for a relatively compact packsaw which can be conveniently transported and carried on the body of the person as well as a part of a wilderness supply pack. For example, the person may set up camp within a wilderness area. Although a conventional packsaw can be carried by the person during excursions from camp, the conventional device is not conveniently carried, particularly if a number of other items are also carried.

There is, therefore, a need for a small compact packsaw which can be conveniently carried upon the person's body.

SUMMARY OF THE INVENTION

The present invention is particularly directed to a compact packsaw which can be conveniently housed in a case for transport, as by convenient attachment to the belt or other supporting body apparel, as well as stored as a part of a relatively large supply pack.

Generally in accordance with the present invention the compact packsaw includes the flat blade, preferably having different structured teeth on the opposite edges thereof, in combination with a multiple part handle unit secured to the one end of the blade, with the several handle parts adapted to collapse over the adjacent end, and particularly the cutting edges of the adjacent end of the blade. The collapsed handle provides a protective cover over the blade, while the extended handle provides an effective manually held operating handle for cutting with the packsaw In a preferred embodiment of the invention, the handle structure consists of a pair of generally U-shaped channel members having a relatively long base section connected by side legs, one of which is preferably slightly longer than the other. The channel members are mounted with the bases in opposed adjacent relation in the extended handle operating position. Relatively short legs are pivotally interconnected to the handle end of the blades, and in the extended position the larger or outer legs with the base sections define a T-shaped handle unit. In a particularly unique, practical structure, the short, mounting legs are recessed to telescope over the blade. The outer or operating handle legs are also formed with central edge recesses. The recessed structure of the blades permit pivoting of the abutting channel members away from each other, around and toward the opposite edges of the blades. The recessed handle legs telescope over the blade, with the inner wall of the base section abutting or closely adjacent the edges.

The inventor has found that the packsaw of the present invention provides a simple, reliable and effective saw for use in back packing and similar excursions into the wilderness.

DESCRIPTION OF THE DRAWING FIGURES

The drawing furnished herewith illustrates a preferred construction of the present invention in which the above advantages and features are clearly disclosed as well as others which will be readily understood from the following description.

In the drawing:

FIG. 1 is an elevational view of a packsaw constructed in accordance with the teaching of the present invention;

FIG. 1a is a fragmentary side view showing the handle structure;

FIG. 2 is a view similar to FIG. 1 with the blade broken away and illustrating an initial folding action of the handle structure with respect to the blade; and FIG. 3 is a view showing the handle structure completely folded for storage and the like, and with the packsaw located within a suitable carrying case.

DESCRIPTION OF THE ILLUSTRATED EMBODIMENT

Referring to the drawing and particularly to FIG. 1, the packsaw of the present invention includes an elongated cutting blade 1 of a generally tapered configuration. A handle structure 2 constructed in accordance with the teaching of the present invention is secured to the wide end of the tapered blade 1 for convenient manipulation of the saw for cutting. The handle structure 2 is a two-piece unit including a pair of generally similar members 3 and 4. The members 3 and 4 are pivotally connected to the corresponding wide end of the blade 1 to define a generally T-shaped protruding handle 2 for operation of the saw. The two parts are adapted to be moved about the end of the blade, as shown in FIGS. 2 and 3, to a totally collapsed or folded position telescoped over the cutting edges of the blade 1, as shown in FIG. 3, for transport and the like. A suitable protective case 5 may be provided for the folded saw assembly.

More particularly, the blade 1 is a typical thin saw blade having the opposite edges 6 and 7 of the blade 1 formed with special teeth for cutting by reciprocating motion, in accordance with conventional practice. In the illustrated embodiment of the invention, the one edge 6 is formed with relatively small triangular teeth 8 particularly adapted for fine cutting of wood, steel and the like. The opposite edge 7 of the blade 1 is formed with a series of similar large teeth 9, each of which is formed as a generally two-point member. The teeth 9 are particularly adapted for cutting of rough lumber, trees and the like. The outermost narrow end or tip 10 of the blade 1 is rounded to eliminate a sharp dangerous edges.

The blade 1 provides a convenient construction particularly adapted for use in the woods and the like.

The handle structure 2 is specially constructed to permit the collapsing thereof. In the illustrated embodiment, each of the members 3 and 4 is identically formed, and reference is made to the right hand handle member 4 for description thereof.

The member 4 has a generally U-shaped configuration including an elongated base 12 with a relatively short mounting leg 13 and a relatively long hand gripping leg 14.

The elongated base 12 has an exterior flat edge wall 15 extending substantially the length of the U-shaped member 4. The inner edge 16 of the base is a shallow and U-shaped, merging with curved portions of the side legs 13 and 14.

The short mounting leg 13 generally has a length equal to one half the width of the wide handle end of the cutting blade 1. The leg 13 is substantially enlarged and formed with a somewhat greater thickness than the base 12, as shown in FIG. 1a. The leg 12 is bifurcated to form an edge recess or slot 17 extending through the leg to the base. The slot 17 is formed with a slight draft, as shown, and of a width at least as great as the saw blade and the teeth. The leg 13 telescopes over the wide handle end of the blade 1, and is pivotally secured thereto by a pivot pin 18. The blade 1 may be formed with teeth through the length including the handle recess 17, or the teeth may be removed within the end portion in slot 17. The pivot pin 18 is located toward the outer edge of the blade 1 and the outer end of the mounting leg 13. The handle member 4 is thus pivoted about the outer end of the blade 1, as shown in FIGS. 1-3 between the handle position of FIG. 1 and the storage position of FIG. 3.

The leg 13 is formed with an exterior curved edge surface 19 extending outwardly and around the leg from the base 12. The curved edge 19 permits the U-shaped members 3 and 4 to pivot from the operating handle position with the bases 12 in engagement and particularly provide for rolling contact as the members initially pivot from their extended position.

The base 12 is a relatively thin portion extending from the mounting leg 1 to the handle leg or hand gripping 14. The hand gripping leg 14 is similar to leg 13 and is a generally rectangular portion. The handle leg 14 projects outwardly for a substantial length which, in combination with the opposite leg 14', defines the cross bar of a T-shaped handle. The inventor has found such handle is conveniently held by the operator by appropriately placing of the respective fingers about each of the legs. The legs are constructed tilting slightly outwardly to provide an optimum handle gripping configuration.

Further, the outer leg 14 is also a bifurcated member with an edge slot 20 extending substantially from the outer lateral edge inwardly throughout the substantial depth thereof, and approximately to the base 12. The width of the slot 20 is at least as great as the thickness of the blade and teeth. The slot 20 is also preferably formed with a slight draft to define an enlarged outer edge opening for receiving the edge of the blade 1, particularly passing over the teeth of the blade. Thus, in folding of the handle from the operating position to the transport position, the leg 14 telescopes over the blades 1, with the outer end moving toward each, and shown terminating slightly in spaced relation.

In any event the multiple part handle is folded into protective relation over the blade 1 and significantly reduces the length of the blade and further provides for convenient placement in a carrying case 5, with the outer edge of the blade in a protective cover. The total blade edge is covered by the casing and/or the handle member in the transport and storage position. The casing can be formed with or without a folding flap, and is shown as an open-top, flapness casing.

Thus, with the outer top edges of the blade 1 protected, as shown in FIG. 3, the packsaw can be safely housed within a suitable open top case. The outer exposed end of the saw, and particularly the folded protective handle parts 3 and 4, is then conveniently available for grasping by the user to remove it from the casing without danger of engaging the sharp blade teeth.

The present invention thus provides an effective packsaw conveniently carried and used.

Various modes of carrying out the invention are contemplated as being within the scope of the following claims, particularly point out and distinctly claiming the subject matter which is regarded as the invention.

I claim:

1. A packsaw adapted to be housed in an open top protective carrying sheath comprising an elongated blade having teeth extended at least along one edge, a multiple part handle secured to one end of said blade, said handle including first and second handle members, each of said handle member being similarly formed and having a first end pivotally secured to the blade and movable between an extended position defining an operating handle, each of said handle members having an outer end enlargement portion which extends laterally outwardly and in the extended position of said handle members defines a substantially T-shaped hand-gripping portion, each of said outer end enlargement portions having outer edge slots adapted to telescope over said blade and thereby provide for pivoting of the handle members onto the adjacent end of said blade in a storage position, each of said handle members being substantially shorter than said blade and thereby telescoped over substantially less than one-half the blade for protecting the exposed end portion when in said storage position for location in said sheath.

2. A packsaw comprising an elongated blade having teeth extended at least along one edge, a multiple part handle secured to one end of said blade, said handle including first and second handle members pivotally secured to the blade and movable between an extended position defining an operating handle, said handle members having outer edge slots adapted to telescope over said blade and thereby provide for pivoting of the handle members onto the adjacent end of said blade in a storage position, and wherein each of said handle members is a generally U-shaped member having a first leg shorter than the second leg and joined by a base section, said handle having said base sections in abutment in the extended position, said first leg being pivotally attached to the saw blade with the second leg extending outwardly of the opposite handle members, said first and second handle members located with the corresponding based section in abutting relation thereby defining a substantially T-shaped handle extending from said blade, said second leg having outer edge slots whereby said handle member is adapted to be pivoted over the blade with the blade located within the slots.

3. A packsaw comprising an elongated blade having teeth extended at least along one edge, a multiple part handle secured to one end of said blade, said handle including first and second handle members pivotally secured to the blade and movable between an extended position defining an operating handle, said handle members having outer edge slots adapted to telescope over said blade and thereby provide for pivoting of the handle members onto the adjacent end of said blade in a storage position, and wherein each of said handle members is an U-shaped member having a first leg pivotally coupled to the saw blade and adapted to be extended outwardly with a base section as an extension of the saw blade and with said base sections of said handle members in abutting relationship, the second leg of each handle member extending laterally outwardly of the base section, each of said second legs being bifurcated to define a center slot and said first leg having a center slot aligned with and extending over the blade whereby said handle members are adapted to be folded back onto the saw blade.

4. A packsaw adapted to be housed in an open top protective carrying sheath, comprising an elongated blade having teeth extended at least along one edge, a multiple part handle secured to one end of said blade, said handle including first and second handle members pivotally secured to the blade and movable between an extended position defining an operating handle and having outer edge slots adapted to telescope over said blade and thereby provide for pivoting of the handle members onto the adjacent end of said blade in a storage position, each of said handle members being substantially shorter than said blade and thereby telescoped over substantially less than one-half the blade for protecting the exposed end portion when in said storage position for location in said sheath, wherein said handle members are substantially U-shaped and having outer edges with first and second laterally offset portions which extend laterally outwardly from the corresponding portions of the opposite handle member in the extended position and having outer edge slots adapted to receive the cutting edge of the blade adjacent the blade pivot connection in the storage position, said blade is a flat, plate-like member having opposite first and second cutting edges, said teeth on one edge being for rough cutting and on the second edge being for fine cutting.

5. A packsaw comprising a flat tapered blade having cutting teeth on the opposite edges, said blade having a wide straight end and an outer narrow rounded end, a pair of identical handle members secured to said wide end of the blade, each of said handle members being U-shaped having a short mounting leg and a long handle leg, said short mounting leg having an edge slot telescoped over the blade and being pivoted to the wide end of the blade, and each of said handle legs having an edge slot, whereby the handle members are pivotal onto the adjacent edges of the blade.

* * * * *